(12) United States Patent
Betancourt

(10) Patent No.: US 9,715,683 B2
(45) Date of Patent: Jul. 25, 2017

(54) SYSTEM AND METHOD FOR CONTROLLING SERVICE SYSTEMS

(75) Inventor: Ernest Blas Betancourt, Lascassas, TN (US)

(73) Assignee: Epona LLC, Franklin, TN (US)

( * ) Notice: Subject to any disclaimer, the term of this patent is extended or adjusted under 35 U.S.C. 154(b) by 418 days.

(21) Appl. No.: 13/569,438

(22) Filed: Aug. 8, 2012

(65) Prior Publication Data

US 2012/0303531 A1 Nov. 29, 2012

Related U.S. Application Data

(63) Continuation-in-part of application No. 11/678,125, filed on Feb. 23, 2007, now abandoned.

(51) Int. Cl.
G06Q 20/20 (2012.01)
G06Q 20/18 (2012.01)
G06Q 20/32 (2012.01)

(52) U.S. Cl.
CPC ............ *G06Q 20/20* (2013.01); *G06Q 20/18* (2013.01); *G06Q 20/202* (2013.01); *G06Q 20/204* (2013.01); *G06Q 20/3278* (2013.01)

(58) Field of Classification Search
CPC ...... G06Q 20/20; G06Q 20/18; G06Q 20/204; G06Q 20/202; G06Q 20/3278
See application file for complete search history.

(56) References Cited

U.S. PATENT DOCUMENTS

| | | |
|---|---|---|
| 4,250,550 A | 2/1981 | Fleischer |
| 4,490,798 A | 12/1984 | Franks et al. |
| 4,658,371 A | 4/1987 | Walsh et al. |
| 5,400,018 A | 3/1995 | Scholl et al. |
| 5,694,322 A | 12/1997 | Westerlage et al. |
| 5,700,999 A | 12/1997 | Streicher et al. |
| 5,724,243 A | 3/1998 | Westerlage et al. |
| 5,819,234 A | 10/1998 | Slavin et al. |
| 5,862,222 A | 1/1999 | Gunnersson |
| 5,913,180 A | 6/1999 | Ryan |
| 5,923,572 A | 7/1999 | Pollock |
| 5,970,481 A | 10/1999 | Westerlage et al. |
| 5,974,356 A | 10/1999 | Doyle et al. |
| 5,987,377 A | 11/1999 | Westerlage et al. |

(Continued)

OTHER PUBLICATIONS

Jun. 3, 2015 Non-Final Office Action issued in U.S. Appl. No. 11/678,125.

(Continued)

*Primary Examiner* — Asfand Sheikh
(74) *Attorney, Agent, or Firm* — Banner & Witcoff, Ltd.

(57) ABSTRACT

A pump surrogate controller system and method allows multiple point of sale systems to control a particular service system. For example, a register at a cashier stand may activate the same fuel pump as an automated checkout kiosk. The surrogate controller may further coordinate the transmission of transaction data to the appropriate destinations. For example, transaction information relating to a fuel transaction may be delivered to the appropriate point of sale for completion. Transactions that are pre-authorized prior to a purchaser's arrival at a service station may also be activated using the surrogate controller. Fuel dispensing may be dependent on confirmation that the vehicle and dispensing pump are in close proximity.

17 Claims, 13 Drawing Sheets

(56) References Cited

U.S. PATENT DOCUMENTS

| | | | |
|---|---|---|---|
| 6,045,040 | A | 4/2000 | Streicher et al. |
| 6,072,402 | A | 6/2000 | Kniffin et al. |
| 6,085,805 | A * | 7/2000 | Bates .......................... 141/94 |
| 6,089,284 | A | 7/2000 | Kaehler et al. |
| 6,116,505 | A * | 9/2000 | Withrow ...................... 235/381 |
| 6,124,810 | A | 9/2000 | Segal et al. |
| 6,128,551 | A * | 10/2000 | Davis et al. ................. 700/236 |
| 6,154,658 | A | 11/2000 | Caci |
| 6,195,019 | B1 | 2/2001 | Nagura |
| 6,213,393 | B1 | 4/2001 | Streicher et al. |
| 6,233,563 | B1 | 5/2001 | Jefferson et al. |
| 6,338,008 | B1 | 1/2002 | Kohut et al. |
| 6,343,241 | B1 | 1/2002 | Kohut et al. |
| 6,370,454 | B1 | 4/2002 | Moore |
| 6,389,337 | B1 | 5/2002 | Kolls |
| 6,441,732 | B1 | 8/2002 | Laitsaari et al. |
| 6,554,183 | B1 | 4/2003 | Sticha et al. |
| 6,574,603 | B1 | 6/2003 | Dickson et al. |
| 6,615,186 | B1 | 9/2003 | Kolls |
| 6,616,036 | B2 | 9/2003 | Streicher et al. |
| 6,738,697 | B2 | 5/2004 | Breed |
| 6,747,365 | B2 | 6/2004 | Reinold et al. |
| 6,856,820 | B1 | 2/2005 | Kolls |
| 6,895,310 | B1 | 5/2005 | Kolls |
| 6,899,151 | B1 * | 5/2005 | Latka et al. ................. 141/392 |
| 6,965,872 | B1 | 11/2005 | Grdina |
| 6,991,160 | B2 | 1/2006 | Demere |
| 7,379,920 | B2 | 5/2008 | Leung et al. |
| 7,481,366 | B2 | 1/2009 | Demere |
| 7,604,169 | B2 | 10/2009 | Demere |
| 7,668,644 | B2 | 2/2010 | Tengler et al. |
| 7,707,108 | B2 * | 4/2010 | Brown et al. ................. 705/40 |
| 2002/0020742 | A1 | 2/2002 | Streicher et al. |
| 2002/0065787 | A1 | 5/2002 | Evers et al. |
| 2002/0072963 | A1 | 6/2002 | Jonge |
| 2002/0186144 | A1 | 12/2002 | Meunier |
| 2003/0083060 | A1 | 5/2003 | Menendez |
| 2003/0107548 | A1 | 6/2003 | Eun et al. |
| 2003/0120608 | A1 | 6/2003 | Pereyra |
| 2003/0167345 | A1 | 9/2003 | Knight et al. |
| 2003/0195676 | A1 | 10/2003 | Kelly et al. |
| 2004/0140354 | A1 | 7/2004 | Demere |
| 2004/0200897 | A1 | 10/2004 | Demere |
| 2004/0215575 | A1 | 10/2004 | Garrity |
| 2004/0243285 | A1 | 12/2004 | Gounder |
| 2005/0102074 | A1 | 5/2005 | Kolls |
| 2005/0125117 | A1 | 6/2005 | Breed |
| 2005/0184155 | A1 | 8/2005 | Pinkus |
| 2005/0234616 | A1 | 10/2005 | Oliver et al. |
| 2005/0248444 | A1 | 11/2005 | Joao |
| 2005/0273218 | A1 | 12/2005 | Breed et al. |
| 2006/0012479 | A1 | 1/2006 | Ezra |
| 2006/0022842 | A1 | 2/2006 | Zoladek |
| 2006/0052980 | A1 | 3/2006 | LaFollette et al. |
| 2006/0108413 | A1 | 5/2006 | Demere |
| 2008/0091544 | A1 | 4/2008 | Linlor |
| 2008/0214173 | A1 | 9/2008 | Preiss et al. |

OTHER PUBLICATIONS

Mar. 9, 2016 (US) Non-Final Office Action—U.S. Appl. No. 12/573,604.

May 19, 2016 (US) Non-Final Office Action—U.S. Appl. No. 11/678,125.

Office Action received in corresponding U.S. Appl. No. 11/678,125 mailed Feb. 11, 2016.

\* cited by examiner

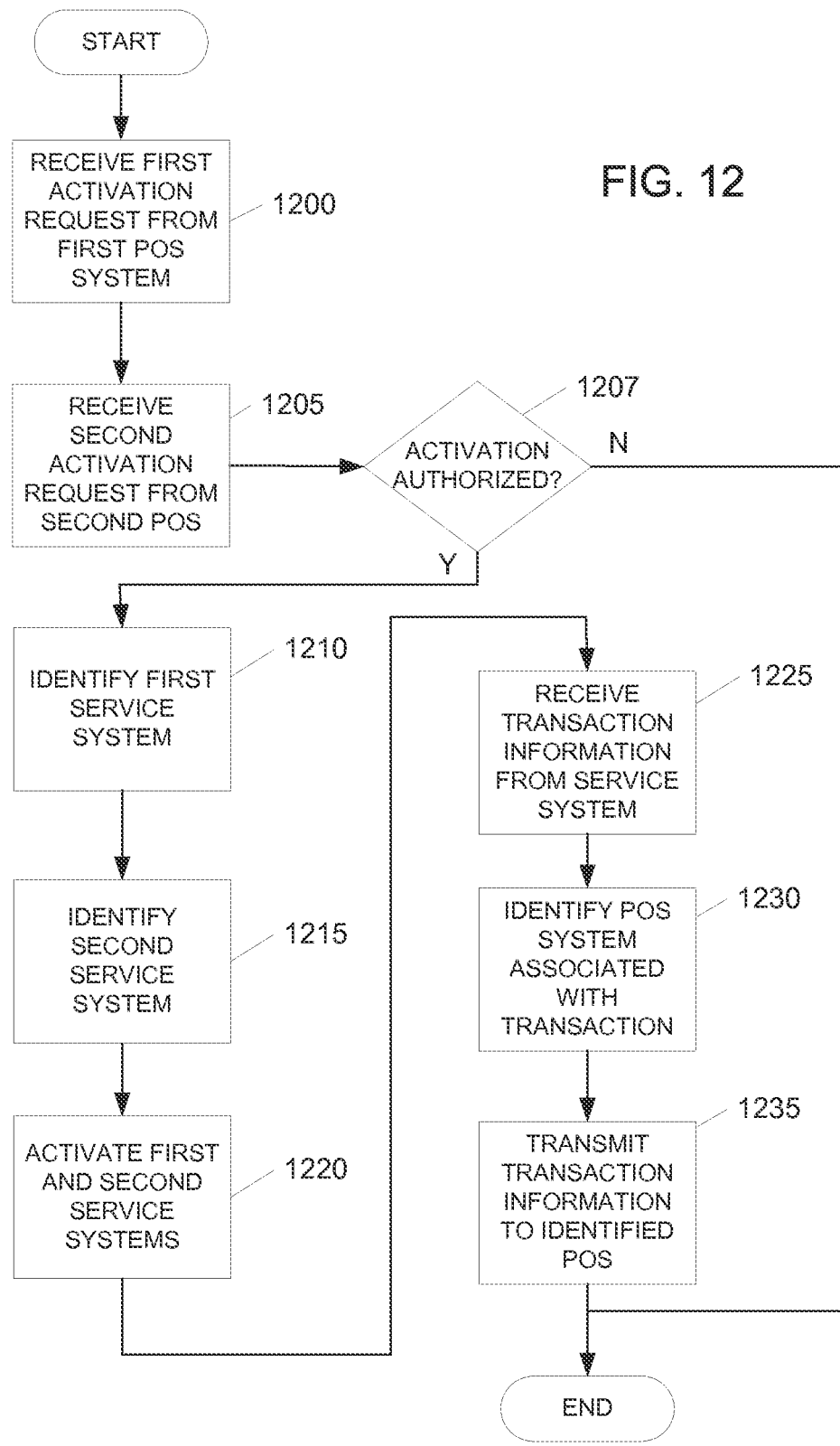

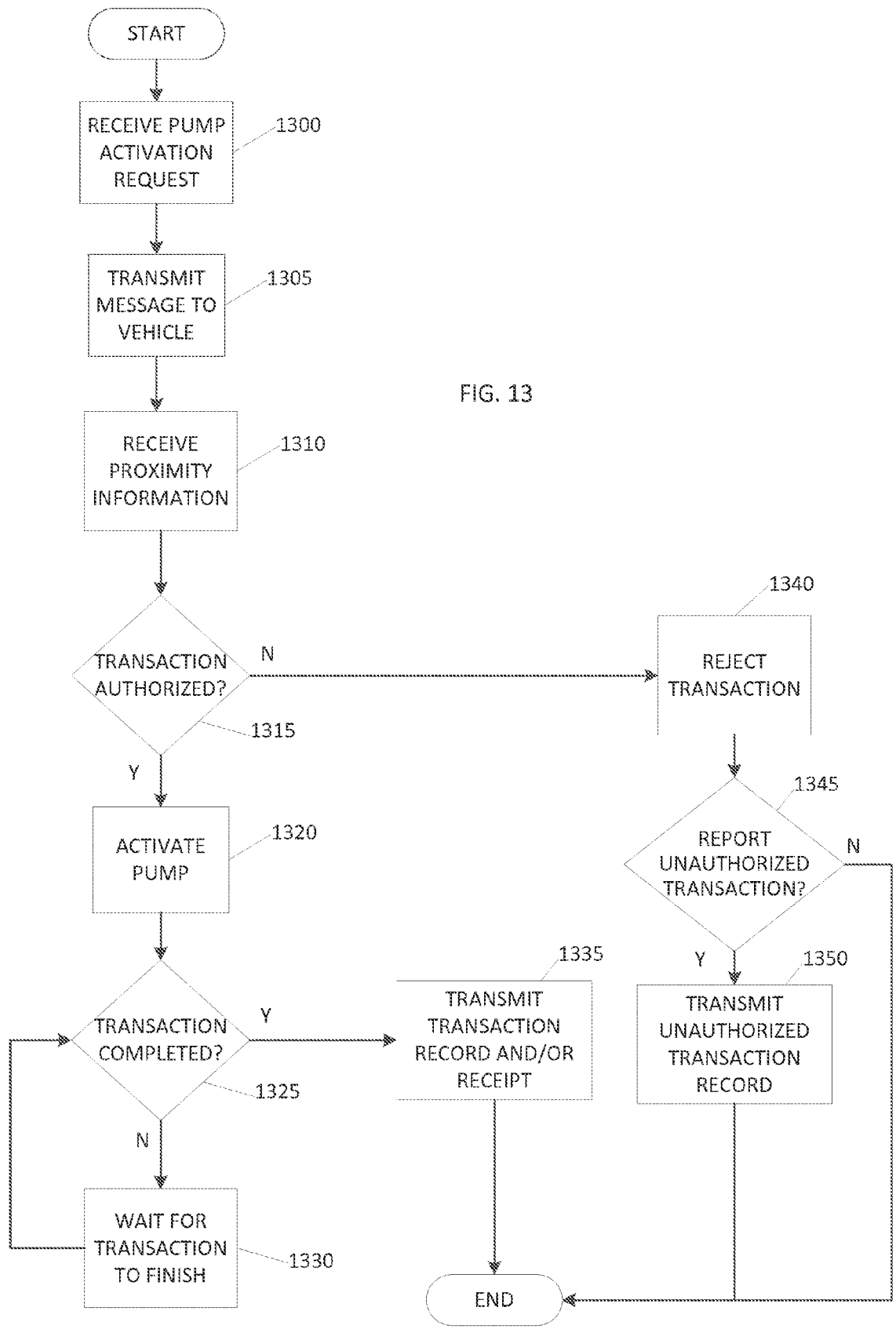

SYSTEM AND METHOD FOR CONTROLLING SERVICE SYSTEMS

CROSS REFERENCE TO RELATED APPLICATIONS

This application is a continuation-in-part of and claims the benefit of priority from U.S. application Ser. No. 11/678,125, filed on Feb. 23, 2007, which is incorporated herein by reference in its entirety.

FIELD OF ART

The invention relates generally to a method and a system for controlling service systems. Specifically, the invention relates to a system and method for providing control of a service system to one or more points of sale.

BACKGROUND

In a society where the assertion "time is money" has become more fact than fiction, efficiency and punctuality have developed into highly valued assets in many industries. In the transportation and shipping industry, for example, efficiency and punctuality are defining qualities that often set successful companies apart from those that fail. Particularly, greater efficiency and punctuality may lower transportation and shipping costs, which may, in turn, reduce costs to potential clients and attract a larger customer base.

One aspect of transportation and shipping that may impact the cost and punctuality of deliveries is the need to refuel transportation vehicles. For instance, many packages and goods are delivered using trucks that often travel long distances between pick-up and delivery. Since a truck or vehicle's fuel tank is of a limited size, drivers need to occasionally break from the transportation route to refuel. Refueling time may vary greatly depending on a variety of factors including required processing time for a fuel sale and/or transaction. Typically, a driver of a transportation vehicle must enter a refueling station, park the vehicle, enter authorization and/or payment information for the transaction and wait for approval before starting to refuel. In other words, delays may be caused by communication and processing time of transaction information at a point of sale. In many instances, these aforementioned processes may take significant amounts of time thereby delaying delivery of goods and potentially increasing shipping costs. Delays in the shipping process may further have negative impacts on the recruitment of drivers as drivers might not want to spend significant amounts of time refueling and obtaining other various services.

Additionally, during breaks, drivers of trucks and other transportation vehicles may wish to eat a meal or take a shower. Beyond the time required to perform these tasks, drivers may need to first purchase the meals and/or services. For example, a driver may have to spend time purchasing shower time and/or access from a refueling station agent. As such, this purchasing time may further add to the delays and costs associated with shipping and delivery. Again, the delays and, in some instances, increased costs may be attributable to the time required to process transaction information in order to complete the transaction.

Still further, a driver may be required to manage documentation and information provided, received and/or generated during the processing of a sales transaction. For example, a driver may receive receipts relating to the sales of the fuel, services and/or goods. As such, drivers may often forget or lose the numerous amounts of information and documentation produced during a lengthy transportation route.

Additionally, increased costs may occur as a result of theft of fuel. In some cases, drivers activate pump dispensers but deliver the dispensed fuel to an associate's vehicle rather than the driver's vehicle, with the costs of the dispensed fuel charged to the carrier or company employing the vehicle and/or driver.

SUMMARY

Many of the aforementioned problems are solved by implementing a system and method for pre-authorizing and/or pre-processing transaction requests prior to a vehicle's arrival at a service station. A back office system may broadcast or advertise services of a particular service station to vehicles entering a wireless service area implemented by the back office system. A wireless service area, as used herein, relates to an area where a wireless communication connection may be established with the system implementing the service area. The back office system may subsequently receive transaction requests from vehicle operators who wish to use one or more services of the service station. The transaction requests may include a variety of information including, but not limited to, vehicle related information, driver related information, company or organization information and service information. A transaction request may be generated and transmitted automatically upon entering the wireless service area of the back office system. Alternatively or additionally, a transaction request may be generated and transmitted in response to a manual determination by a driver or operator. To validate and authorize the transaction, the back office system may contact a carrier or company information system associated with the vehicle and/or driver. The back office system or a carrier information system may confirm the validity of a driver or vehicle's credentials and determine whether the company or carrier has sufficient funds for the requested transaction. Upon approval, the back office system may then transmit authorization information to a point of sale at the service station. The driver and vehicle may then proceed directly to performing the requested service and/or transaction upon arriving at the station without first having to first transact with the point of sale.

According to another aspect, vehicle related information may be identified or determined through an engine control module (ECM) of the vehicle. The ECM may include or be connected to a short-range wireless communication device so that a driver's wireless communication device may retrieve vehicle data from the ECM. The short-range wireless communication device may use a variety of short-range wireless protocols including radio frequency (RF) transmissions, Bluetooth and the like. The ECM may further digitally or electronically sign data originating from the ECM to guarantee authenticity.

In yet another aspect, once a vehicle and driver arrive at a service station, the driver may activate the pump by entering a first code indicating a pre-authorized transaction. The pump may then prompt the user for a transaction code to activate the pre-authorized service. For example, once a transaction request has been processed, the back office system and/or the point of sale system may issue the requesting driver a transaction password. Once the driver arrives at the pump station, the driver may enter a pre-authorized transaction code that then allows the driver to enter the transaction password. If the transaction password entered by the driver matches the originally issued password, the pump or service system may be activated. The password and transaction code may comprise a sequence of numbers, an alphanumeric code, a series of symbols and the like.

Alternatively or additionally, a fuel pump or dispenser may scan a Radio Frequency ID (RFID) chip of the vehicle prior to activation. The RFID information may be validated by a point of sale system, which may then authorize activation of the fuel pump or dispenser. In one or more alternate embodiments, an RFID chip may be embedded in each fuel pump or dispenser. Accordingly, rather than the fuel pump scanning a vehicle's RFID, the vehicle may scan the fuel pump's RFID. The pump's RFID information may then be transmitted to the back office system for validation and for authorization to activate the pump.

In another aspect, fuel dispensing may require confirmation that the vehicle is in close proximity to the dispenser or pump prior to dispensing fuel. Such an approach may be used to ensure that the fuel is dispensed to the intended vehicle. Vehicle location information may be communicated to the fuel pump or dispenser in one or more approaches. In some embodiments, vehicle location may be determined on a geographic basis; for example using a global positioning satellite (GPS) system or the like. Alternatively, or additionally, the vehicle location may be determined using short-range RF devices such as RFID chip or Near Field Communication (NFC) chip.

A determination of close proximity may depend on the type of location determination method/system used. For example, GPS can determine location within approximately 10-20 meters. Thus, fuel dispensing may be permitted after determining that the dispensing pump and vehicle are within 10-20 meters. In another example, when using RFID or NFC, close proximity may be defined as a range of 0-100 meters for RFID or a few centimeters for NFC. Accordingly, a system may confirm close proximity, for example, by having a first chip or detector in the pump handle and a second chip or detector located close to the gas tank of the vehicle, and permitting fuel dispensing only when the first and second chips are close enough to communicate or detect one another. Multiple methods may be used in combination or separately to determine vehicle location and proximity.

Still further, a surrogate system controller may be integrated into a service station system to allow multiple point of sale systems to control the same service system (e.g., a fuel pump). The surrogate system controller connects to each of the point of sale systems and coordinates transactions and communications between each of the point of sale systems and the service system. In one example, the surrogate controller may determine whether a fuel pump is available to prevent conflicts in transactions at the same fuel dispenser. The surrogate controller may further receive transaction log information from the service system and forward the information on to the appropriate point of sale system. The surrogate controller may also store a copy of all transaction logs for auditing and record-keeping purposes.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIG. 12 is a flowchart illustrating a method for controlling and managing a service system for multiple point of sale systems according to one or more aspects described herein.

FIG. 13 is a flowchart illustrating another method for activating a fuel dispenser according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
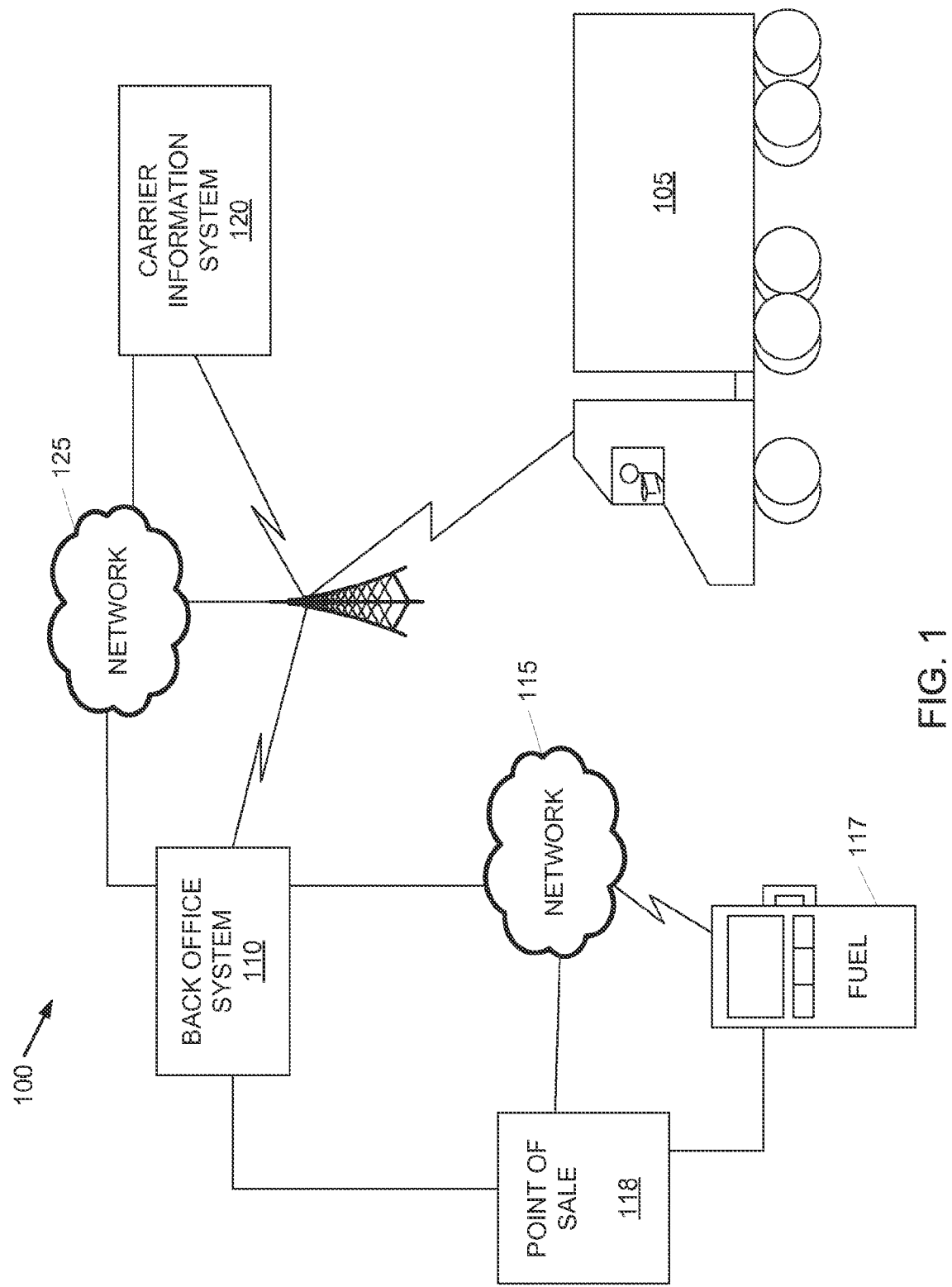
FIG. 1 illustrates a transaction authorization and processing system according to one or more aspects described herein.

FIG. 1 illustrates a transaction processing and authorization system 100 configured to function with transportation vehicles such as truck 105. Conventional sales and service transaction processing and authorization systems require a driver to enter information and authorize a transaction after the driver and vehicle have arrived at the point of sale (e.g., a fuel station). To streamline and facilitate the process, system 100 may conduct transaction authorization and processing via wireless communications prior to the arrival of truck 105 at station 115. System 100 may include various facilities including fuel station 115, back office system 110 and carrier information system 120. A back office system, as used herein, generally refers to a system or infrastructure within an organization that supports various operational processes. Particularly, back office system 110 may be responsible for coordinating transactions between facilities and entities in system 100 that might otherwise have to occur in-person at, e.g., point of sale 118 of station 115. A point of sale, as used herein, refers to a system for processing transactions (e.g., authorizing and completing fuel sale transactions). Point of sale systems may process different types of transactions using different types of authorization and payment methods. In one or more arrangements, truck 105 and/or a driver thereof may pre-authorize a transaction such as a fuel sale while en route to fuel station 115 rather than upon reaching station 115. Upon arrival at station 115, the driver and truck 105 may proceed directly to completing the requested transaction at the service system, e.g., refueling at fuel pump 117, receiving other requested services and/or picking up purchased goods without having to initially engage in a sales transaction. The time that might normally be spent authorizing and processing various transactions at the station is thus saved by performing those tasks during travel/shipping time.

Back office system 110, point of sale 118 and fuel dispenser 117 may be associated with the same company or organization. In such instances, back office system 110, point of sale 118 and fuel dispenser 117 may communicate through an internal network 115 (e.g., an intranet). The internal network may, alternatively or additionally, be separate from an external network 125 such as the Internet. Alternatively, all communications may be routed over a common network.

A driver and/or truck 105 may initiate a transaction with fuel station 115 either manually or automatically. For example, a driver may manually request a transaction with station 115 in response to determining that truck 105 is low on fuel. Alternatively or additionally, truck 105 and/or a communication device (not shown) of the driver of truck 105 may automatically send a transaction request in response to a variety of trigger events. For example, truck 105 and/or a driver's communication device may automatically transmit a transaction request in response to determining that the fuel level is below 25% of capacity. Communication devices that may be used as part of the system include personal digital assistants (PDAs), cellular telephones, portable computers and the like. In one scenario, truck 105 and/or a communication device may automatically generate and issue a transaction request upon entering a wireless communication area serviced by station 115. Station 115 may employ a wireless communication network having a limited range to allow trucks such as truck 105 and/or drivers initiate various transactions once they are within the predefined range or proximity.

Further, both automatic and manual transaction requests may be generated and initiated based on a variety of other factors including the fuel level, a proximity to the closest fuel station versus a proximity to the next closest fuel station and/or an amount of continuous travel time. In one or more arrangements, truck 105 and/or the communication device may use a hybrid automatic/manual transaction request system. As an example, truck 105 and/or a communication device may prompt a driver to confirm a transaction request based on an automatic determination that a transaction request should be generated. Rather than automatically generating and transmitting the request, however, a hybrid transaction system may subsequently request manual confirmation from the driver or user prior to generation and/or transmission of the transaction request.

To facilitate processing and authorization operations, a back office system such as system 100 may create and use multiple network connections with various systems and entities in system 100. In one example, back office system 110 may establish a wireless network connection with truck 105 and/or a driver thereof to send and receive transaction related information. The wireless network connection may include satellite communication links, cellular network connections and/or wireless Local Area Networks (LAN) connections such as Wi-Fi. In one or more arrangements, back office system 110 may further include a system configured to generate a wireless service area that publishes or broadcasts the availability of pre-authorization services to trucks and/or users upon the trucks' and/or users' entry into a predefined proximity of station 115. A range of the wireless service area may be defined based on various factors including power requirements and road topology of the area. Back office system 110 may also manage connections with other entities such as fuel station 115 and a carrier information system 120 associated with truck 105. In particular, back office system 110 may access data stored in carrier information system 120 to verify and authorize transaction requests. Communications between back office 110, carrier information system 120 and fuel station 115 may be conducted using a variety of communication methods including wired and wireless communication solutions. Wired connections, for example, may include local area networks (LANs), Internet Protocol (IP) networks, satellite communication networks, cable networks and/or fiber optic communication links.

According to one or more aspects, back office system 110 may communicate with carrier information system 120 by using truck 105 and/or a communication device of the driver (e.g., cell phone, PDA, smart phone, computer, etc.) as a network intermediary. That is, truck 105 and/or the driver's communication device may forward and/or route communications between back office system 110 and carrier information system 120. Such a configuration may be adopted to protect and maintain a level of privacy and security for carrier information system 120 and the data contained and managed therein. Alternatively, back office system 110 may communicate directly with carrier information system 120 without using truck 105 and/or another communication device as an intermediate link.

Carrier information system 120 may refer to a system, database and/or device corresponding to an organization or a company associated with truck 105 and/or the driver of truck 105. In one or more instances, the organization or company may be a carrier or shipping company. The carrier information system 120 may include a database storing operations information. For example, a carrier information system 120 may store and maintain data relating to shipping routes, delivery times, truck and/or driver assignments, costs and the like. Carrier information system 120 may further receive data and/or input from various sources including truck 105, a driver and/or a third party system such as back office 110. Back office 110, for instance, may send sales and transaction receipts and records to carrier information system 120 corresponding to sales and transactions made by the driver of truck 105. Truck 105 may further transmit location information to carrier information system 120 to allow the carrier company to track the progress of a shipment or delivery.

Alternatively or additionally, carrier information system 120 may implement authorization and security protocols that prevent unauthorized users from accessing system 120. For example, drivers may be required to log in to system 120 prior to viewing and/or editing information thereto. In one or more configurations, third party systems may be required to register with carrier information system 120 to receive full access. Accordingly, a known third party system such as back office system 110 may be assigned unique identification codes for accessing information system 120. Unknown systems and/or users, on the other hand, might only be authorized to use system 120 in a limited or specific capacity. For example, a back office system that is not registered with carrier information system 120 might only be allowed to view publicly available information such as truck identification numbers and the like.

Figure 2:
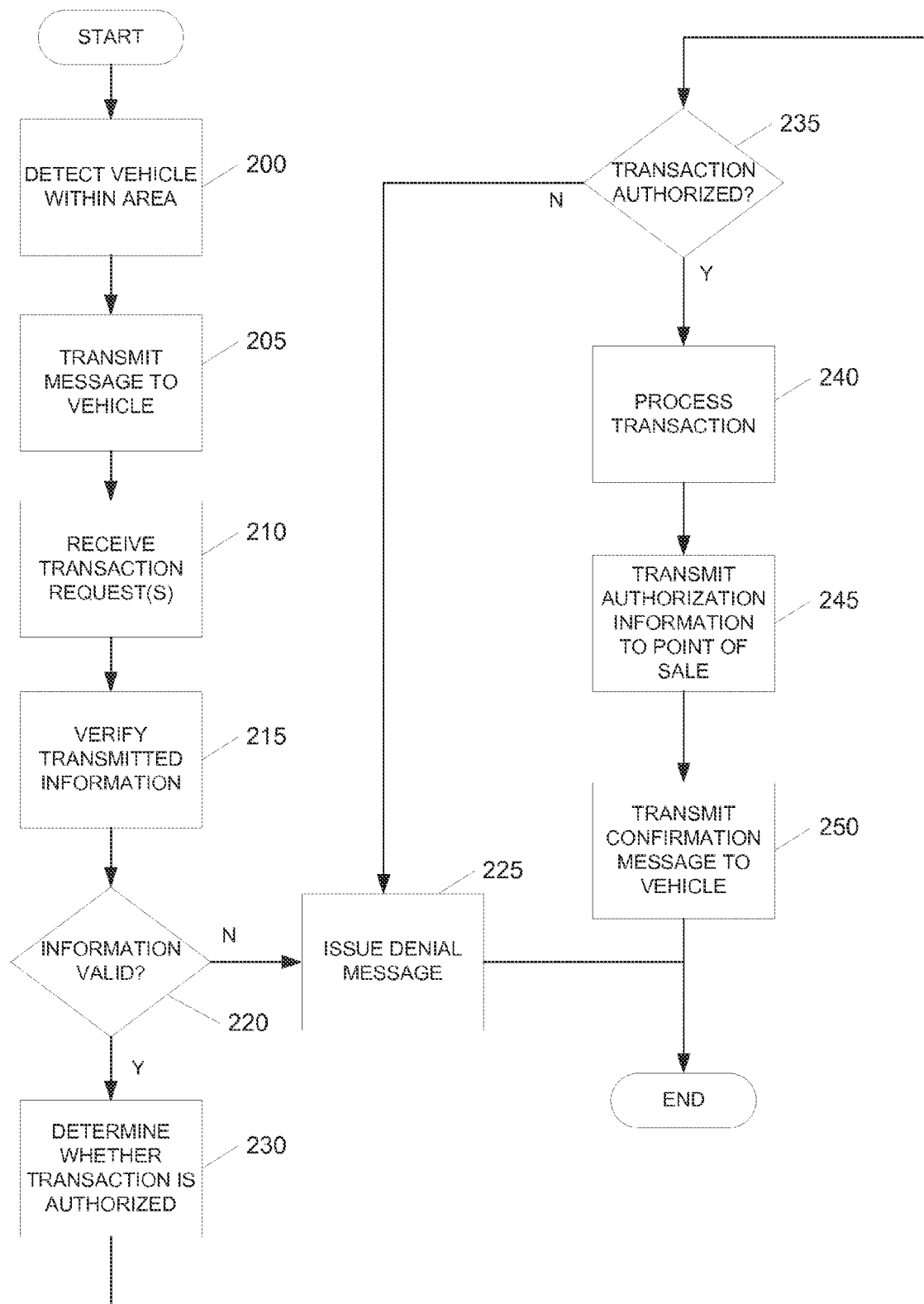
FIG. 2 is a flowchart illustrating a method for pre-authorization and pre-processing vehicle transaction requests according to one or more aspects described herein.

FIG. 2 is a flowchart illustrating a method for pre-authorizing and processing a vehicle transaction request. In step 200, a vehicle's entry into a predefined wireless service area associated with a particular fuel and/or service station may be detected. In one example, a back office system such as back office 120 of FIG. 1 may detect a signal from a wireless communication device of a vehicle and/or a driver once they enter the wireless service area generated by the back office system. In response to detecting the entry of a vehicle and/or wireless communication device associated therewith into the wireless service area, a message may be transmitted to the vehicle and/or wireless communication device in step 205. The message may include a welcome message identifying the fuel and/or service station associated with the back office system. The message may further provide information regarding services and goods available at the station and/or that may be pre-purchased or pre-ordered.

Figure 3:
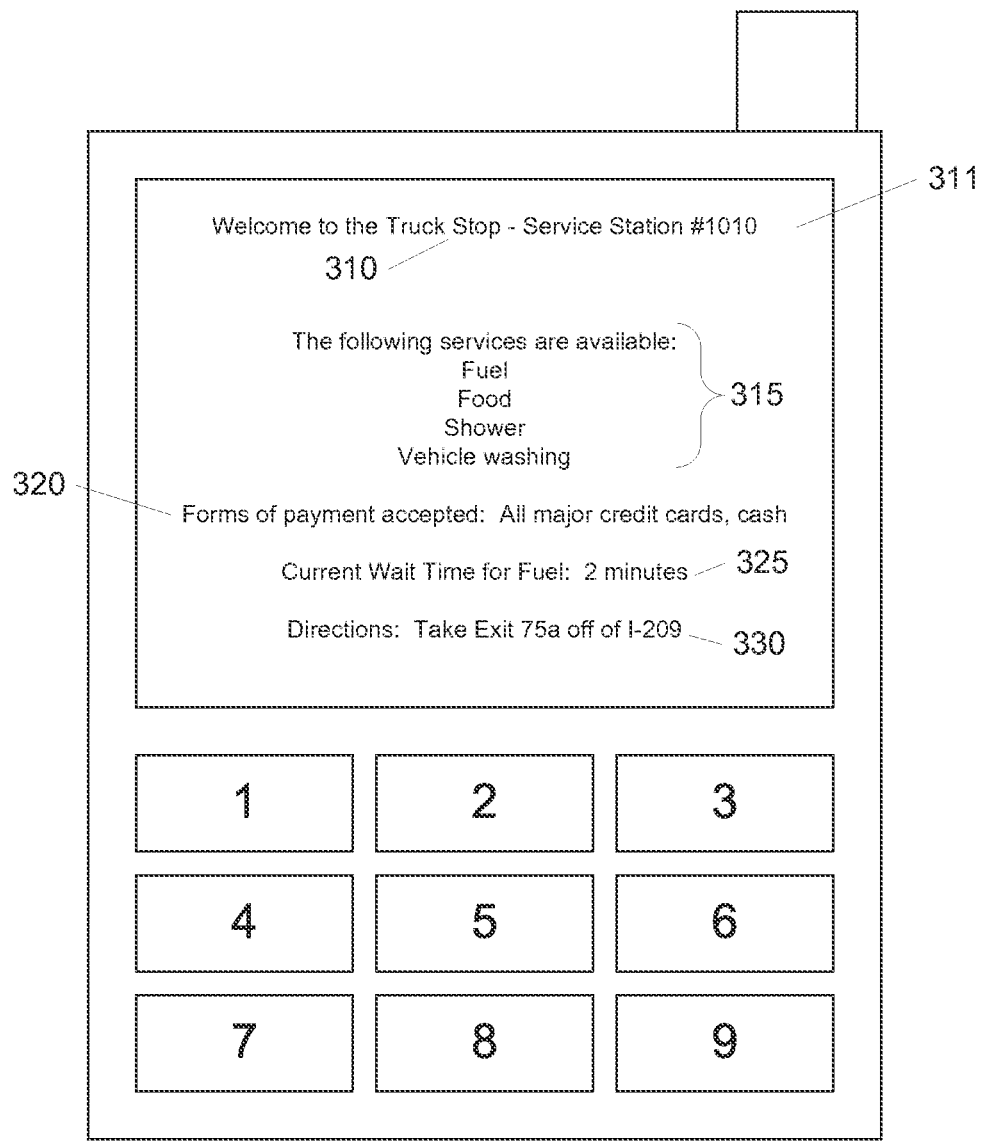
FIG. 3 illustrates a welcome message displayed on a user interface of a communication device according to one or more aspects described herein.

FIG. 3, for example, illustrates a user interface 300 of a communication device 301 displaying a greeting message 302 received from a service station. Greeting message 302 includes a name 310 and ID number 311 corresponding to the sender service station, services and goods available 315, accepted forms of payment 320, a current wait time 325 and directions 330. Services available 315 may indicate all services and/or goods available at the station or, alternatively, might only list those services and/or goods for which transactions may be pre-authorized and/or pre-processed. In addition, to aid a driver's decision as to whether he or she wishes to use the services of the station, current wait time 325 may be provided to reflect how long the driver may be expected to wait before receiving requested services and/or goods (e.g., fuel). Wait time 325 may be calculated in a variety of ways including by determining an average wait time associated with a previous number of vehicles. Wait time 325 may also be based on a time of day, time of year and/or the services/products most requested. Further, directions 330 may be transmitted to aid a driver in finding the station.

Referring again to FIG. 2, the welcome message may be transmitted in multiple ways and formats including by text message, by video messaging, picture messaging, audio messaging and/or combinations thereof. In one or more instances, a driver or truck's communication system may include pre-installed software configured to interact with back office systems and fuel stations. For example, a back office system and/or a fuel station may be able to create pop-up messages on a truck or driver's communication device using the pre-installed software. Alternatively, a back office system may transmit messages using conventional methods that do not require the installation of software on a driver or truck's communication device. Conventional messaging techniques include text, video, picture and/or audio messaging over a communication link such as a cellular network and/or transmitting multimedia messages over the Internet. One of skill in the art will appreciate that a variety of transmission methods may be implemented to convey messages to a wireless communication device.

In step 210, one or more transaction requests may be received from a vehicle or a device of a driver of the vehicle. A transaction request may include various types of information including a vehicle ID associated with the vehicle from which the transaction originates and/or an identifier, e.g., a license or ID number, corresponding to the driver. Vehicle related information may be obtained in a variety of ways including from an engine control module (ECM) using short-range wireless communications. Methods for determining and/or obtaining truck related information is discussed in further detail below. Other pertinent information that may be relayed along with the transaction request may include a requested transaction type, company or organization information, other services requested and/or form of payment. In one or more arrangements, a transmission configured to carry a transaction request may hold and transmit multiple requests. For example, a single transmission from a vehicle or driver may include requests for fuel, a shower reservation, preventative maintenance and food. In systems where communications are charged based on a number of transmissions, the ability to include multiple requests in a single transmission may further help to reduce costs.

Once the one or more transmission requests have been received, information transmitted via the request(s) such as identification information of the requestor (e.g., a requesting truck and/or driver) may be verified in step 215. One method of validating the identification information provided in the transmission request(s) is by confirming the information with a carrier information system such as carrier information system 120 in FIG. 1. A carrier or information system associated with the requestor may be determined from the information included in the transmission request(s). For example, the requestor may explicitly identify a carrier or carrier information system for validating the request information. Alternatively or additionally, a back office system or fuel station may have an internal database associating a truck, driver and/or truck-mounted device ID with a carrier. The internal database may further identify the address and/or contact information corresponding to the carrier based on a priori knowledge, e.g., provided during an initial registration process or sign-up procedure. In one or more arrangements, the internal database may further be used to verify that carrier information received from a requestor does indeed correspond to the requestor's ID prior to validation with the carrier information system.

If the requestor identification information is determined to be invalid in steps 215 and 220, the transaction request may be denied. For example, a denial message may be transmitted to the requestor's communication device in step 225. Alternatively or additionally, a message confirming the information transmitted may be sent to the requestor to provide another validation opportunity. If, however, the requestor identification is validated in steps 215 and 220, a back office system and/or fuel station may then determine whether the transaction or transactions are authorized in steps 230 and 235. The process of authorization may include a variety of steps including determining whether an identified carrier associated with the requestor has sufficient funds to pay for the transaction. Authorization may also relate to determining whether the requestor is authorized by his or her carrier to make purchases or receive cash advances of above a certain amount of money. For example, a carrier may restrict its drivers to purchases at a single station of $40 or less (not including fuel). Accordingly, a transaction request for purchasing $50 dollars worth of specified products would be determined to be unauthorized by the carrier.

If, in steps 230 and 235, a determination is made that the transaction is unauthorized, a denial message may be transmitted to the requestor in step 225. However, in one or more instances, a denial message may include an opportunity for the requestor to revise his transaction request and/or related information. If, on the other hand, a determination is made in steps 230 and 235 that the transaction request or requests are authorized, the requested transaction or transactions may be processed by the back office and/or fuel station in step 240. For example, back office system may process payment authorization for the transaction. Similarly, if a driver requested a service such as a shower reservation, a reservation calendar may be consulted to determine if a requested time is available. Alternatively, if a specific time was not requested, an available slot may be assigned to the driver.

Once the transaction is authorized, the back office system may further transmit authorization information to the point of sale identifying the authorized transaction and providing truck/driver information in step 245. Thus, upon the truck and driver's arrival, the point of sale at the fuel station might not need to verify the transaction with the back office system. In step 250, a welcome and/or authorization message may be sent to the requestor's communication device indicating that the transmission request was authorized and processed. The welcome and/or authorization message may also include other information such as a pump number or ID for fueling, advertisements and/or one or more particulars regarding the services and/or goods requests in the driver's transaction request or requests. In one example, a shower reservation time and/or code may be indicated in a welcome and/or authorization message. The welcome and authorization messages may further be displayed on electronic signage at the fuel station or on a point of sale system (e.g., a fuel pump screen).

In or after any of the steps of the above described method, a confirmation may further be sent to the requestor to confirm the operations being performed or to be performed. For example, in step 250, confirmation may be requested to verify that the driver is still interested in making the now-authorized transactions at the station. Since payment might not have been processed yet, a driver may still have the option to decide against making the originally requested transactions. A driver may change his mind for a variety of reasons including a dislike of an assigned shower reservation time.

Figure 4:
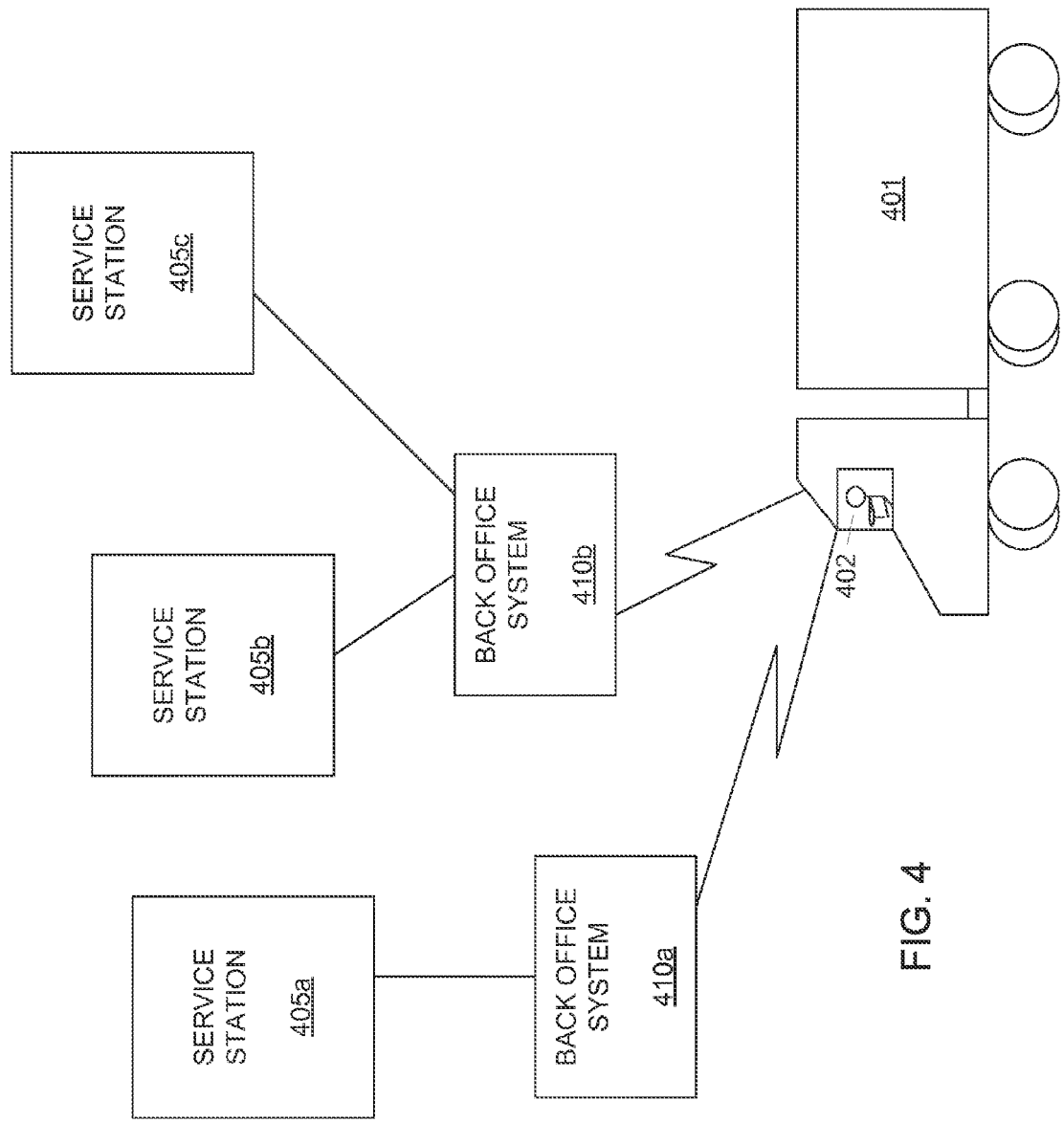
FIG. 4 illustrates a truck and driver transmitting a transaction request to multiple stations and/or back offices according to one or more aspects described herein.

According to one or more aspects, a truck 401 and/or driver 402 may transmit a transaction request to multiple stations 405a, 405b and 405c and/or back offices 410a and 410b as is illustrated in FIG. 4. Driver 402 may be motivated to request transactions from multiple stations 405a, 405b and 405c to determine which station or stations 405a, 405b and/or 405c have the lowest rates, are able to meet all of his or her requests and/or advertise the shortest waiting time. A variety of other station factors may also be considered including station reputation and convenience to truck 401's route. In one or more scenarios, driver 402 might only transmit requests to stations 405a and 405b within a certain proximity to driver 402's current location. For example, stations 405a and 405b may be within 5 miles of driver 402 and truck 401's current location whereas station 405c may lie outside of this threshold distance. As such, in such scenarios, only stations 405a and 405b might receive the transaction request. In one or more situations, driver 402 and/or truck 401 might only send transaction requests to stations 405a, 405b and/or 405c that are within their carrier's network.

According to one or more configurations, a carrier information system (not shown) associated with driver 402 or truck 401 may determine and identify a station from stations 405a, 405b and 405c according to one or more preferences. For example, driver 402 or truck 401 may initiate a transaction request and transmit the request to the carrier information system. The carrier information system may then relay the transaction request to each of stations 405a, 405b and 405c and identify one of stations 405a, 405b and 405c that best match one or more criteria (e.g., lowest fuel cost, availability of showers, etc.). The carrier information system may then notify driver 402 and truck 401 of the selected stations (e.g., stations 405a, 405b or 405c).

To transmit a request to multiple stations 405a, 405b and 405c, driver 402 and/or truck 401 may send individual messages designated for each of stations 405a, 405b and 405c. That is, back office 410a associated with station 405a may receive a transaction request message for station 405a while back office 410b associated with stations 405b and 405c may receive two transaction request messages, one for each of stations 405b and 405c. Alternatively, driver 402 and/or truck 401 may send a single transmission to back office 410b designating both stations 405b and 405c as recipients, rather than transmitting two individual messages (one for each of stations 405b and 405c). Such a method may help save communication costs.

Figure 5:
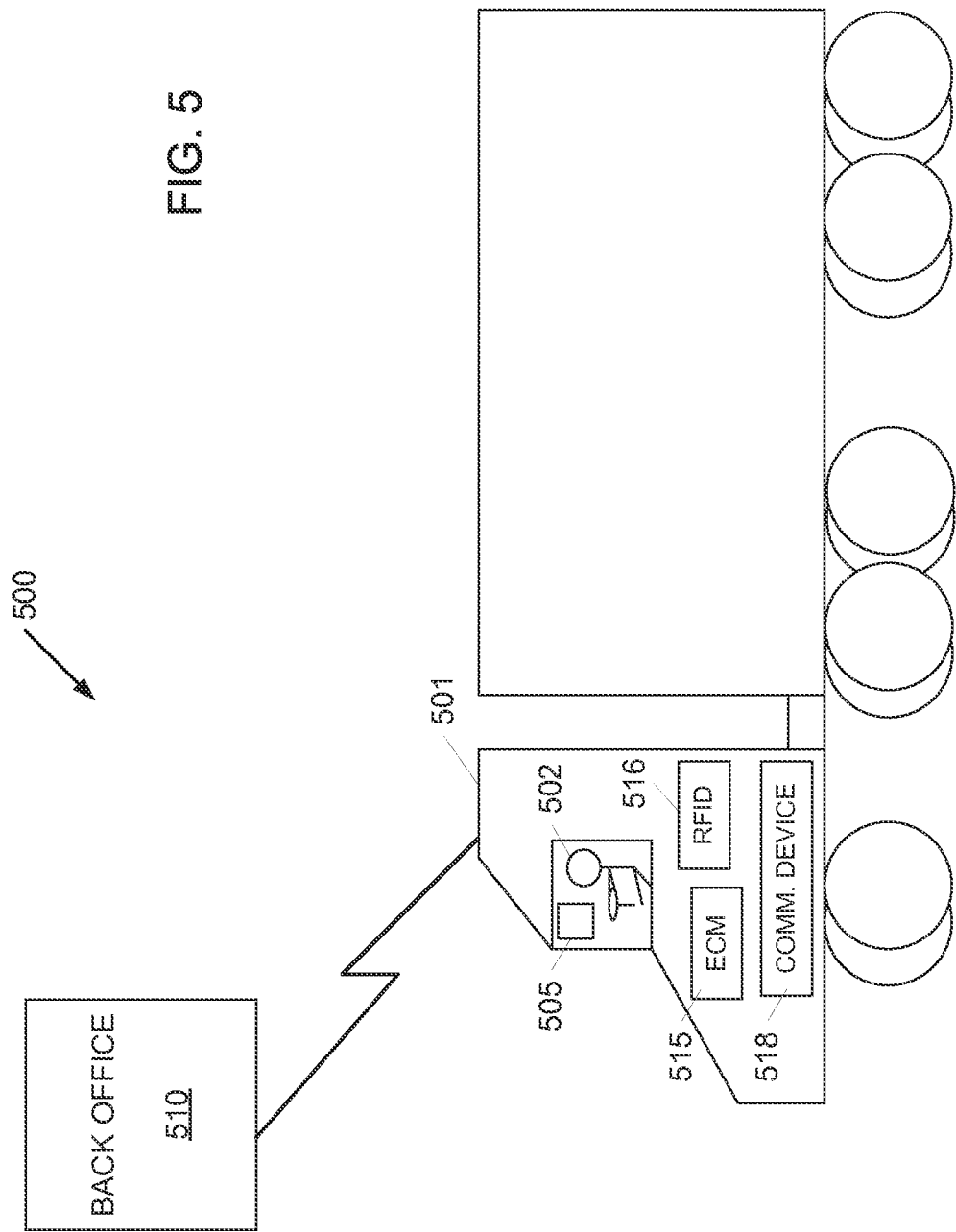
FIG. 5 illustrates a system for obtaining and determining truck related information according to one or more aspects described herein.

Many of the aspects and features described herein relate to the transmission and use of truck and driver identification information. For example, transaction requests may include various types of truck identification information for authorization and verification purposes. FIG. 5 illustrates a system 500 for determining and obtaining truck related information. System 500 includes truck 501, driver 502, communication device 505 and back office 510. Additionally, truck 501 may include multiple components and systems including ECM 515, radio frequency ID (RFID) chip 516 and/or internal communication device 518. Communication device 518 may be one of any number of communication systems including a mobile transceiver and/or a radio communication device. Each of ECM 515 and RFID chip 516 may be used to digitally or electronically sign transmissions sent from truck 501 through communication device 518 or from driver 502 through external communication device 505. For example, ECM 515 and RFID chip 516 may both store a serial number or code unique to truck 501. The unique serial number or code may be encrypted to prevent tampering and hacking.

ECM 515 may further be configured to manage the operation of truck 501's engine and other components. As such, ECM 515 may store a variety of truck related information such as fuel consumption, distance traveled, fuel efficiency and the like. ECM 515 may further be used to time stamp transmissions, maintenance logs and trip logs. Accordingly, truck 501 and/or driver 502 may automatically retrieve and/or transmit requested information from ECM 515 rather than manually determining and entering and transmitting the data. In one example, driver 502's external communication device 505 may be used to extract data from ECM 515 through either a wired or wireless connection established there between. External communication device 505 may subsequently transmit the extracted data to another system such as back office 510. Wireless communication methods and protocols that may be used include both short- and long-range communication techniques such as radio frequency (RF) transmissions, Bluetooth protocols and infrared connections. In one or more arrangements, communications of ECM 515 may be coordinated and facilitated through internal communication device 518. In addition, predefined levels of encryption and security may be used and/or installed to prevent tampering by driver 502. For example, the data stored and/or generated by ECM 515 may be digitally signed by ECM 515 prior to transmission to another system such as communication device 505 or back office 510. Alternatively or additionally, any transmission originating from truck 501 and/or driver 502 may be digitally signed and/or anchored by ECM 515.

Figure 6:
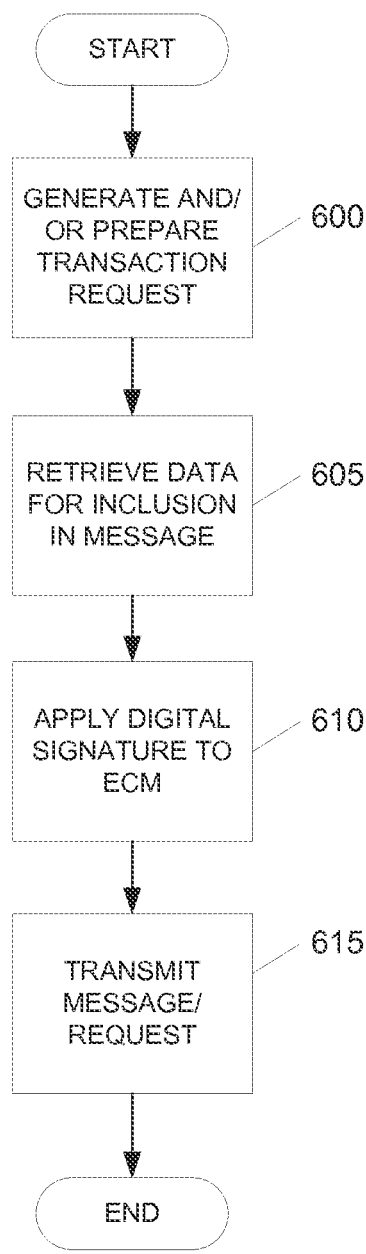
FIG. 6 illustrates a method for determining and obtaining truck related information according to one or more aspects described herein.

FIG. 6 is a flowchart illustrating a method for determining truck related information and anchoring a transmission. In step 600, a message may be generated and/or otherwise prepared by a truck and/or driver. The message may correspond to a transaction request or may include a response to a request for information from one or more entities. For example, a carrier may request trip log information from a driver's wireless communication device and/or a truck's internal communication system. Based on the type of message being generated, various types of information may be retrieved and/or determined and stored in the message in step 605. Once the message has been prepared and is ready for transmission, a digital signature may be obtained from an ECM and applied to the message in step 610. The digital signature may include, for example, a private key of a public/private key pair. The message may then be encrypted using the private key. Alternatively or additionally, the digital signature may include truck specific information such as an ID. The truck specific information may be stored to the message as authentication and/or source data. In step 615, the signed message may then be transmitted to a destination device or system.

Figure 7:
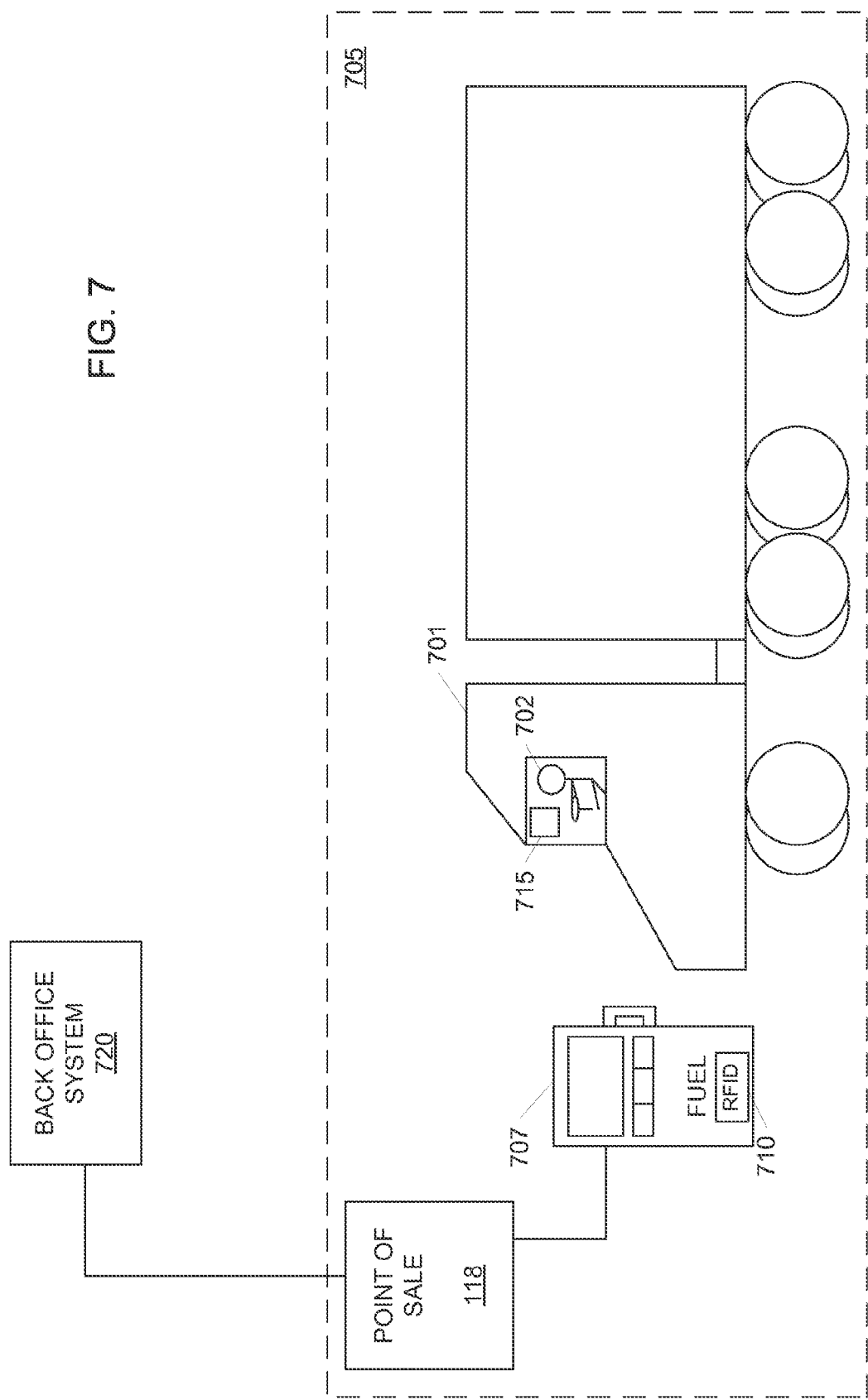
FIG. 7 illustrates a fuel dispenser system according to one or more aspects described herein.

In FIG. 7, once a driver 702 and/or truck 701 has obtained an approval for a transaction and arrives at the station 705, driver 702 and truck 701 may proceed directly to fuel pump or dispenser 707. To further streamline fuel transactions, fuel pump 707 may include an identification device such as RFID chip 710 to facilitate automatic activation of pump 707. In particular, driver 702 may use a wireless device such as communication device 715 to scan RFID chip 710 and transmit identification information stored in chip 710 to an activation system such as back office system 720. In one or more arrangements, truck 701 may include an internal communication system (not shown) that may automatically detect and scan RFID chip 710. The internal communication system may further automatically transmit the RFID information to back office system 720 to activate pump 707. Back office system 720 may, in turn, transmit an activation command to a point of sale (not shown) at the fuel station for activating pump 707.

According to one or more aspects, upon truck 701 and driver 702 reaching pump 707, back office system 720 may be configured to authorize activation of pump 707. Back office system 720 might only authorize the activation of pump 707 upon verifying that truck 701 is authorized to conduct such a transaction. In one or more configurations, pump 707 may include a communication device (not shown) configured to read information from an RFID chip (not shown) or other identification device of truck 701. Accordingly, activation of pump 707 may depend on pump 707 transmitting identification information read from truck 701's RFID chip to a point of sale (not shown) for verification.

In one or more arrangements, driver 702 may activate pump 707 by entering an activation code issued by back office system 720 at point of sale 118. For example, upon authorizing a driver 702's transaction pre-authorization request, back office system 720 may generate and issue a unique authorization code to driver 720. Back office system 720 may further store the authorization code in association with the services requested and authorized. Alternatively or additionally, back office system 720 may transmit the authorization code and authorized services to point of sale 118 and/or pump 707. Thus, upon arriving at the fueling station and pump, driver 702 may enter the authorization code in point of sale 118 or pump 707 to activate pump 707. The authorization code may further be entered to activate other service systems such as a shower or for payment for a meal. According to one or more aspects, an authorization code might not be entered until driver 702 initiates an authorization code entry mode. For example, driver 702 may activate the authorization code entry mode by entering a mode code or a mode key (or combination of keys).

Figure 8:
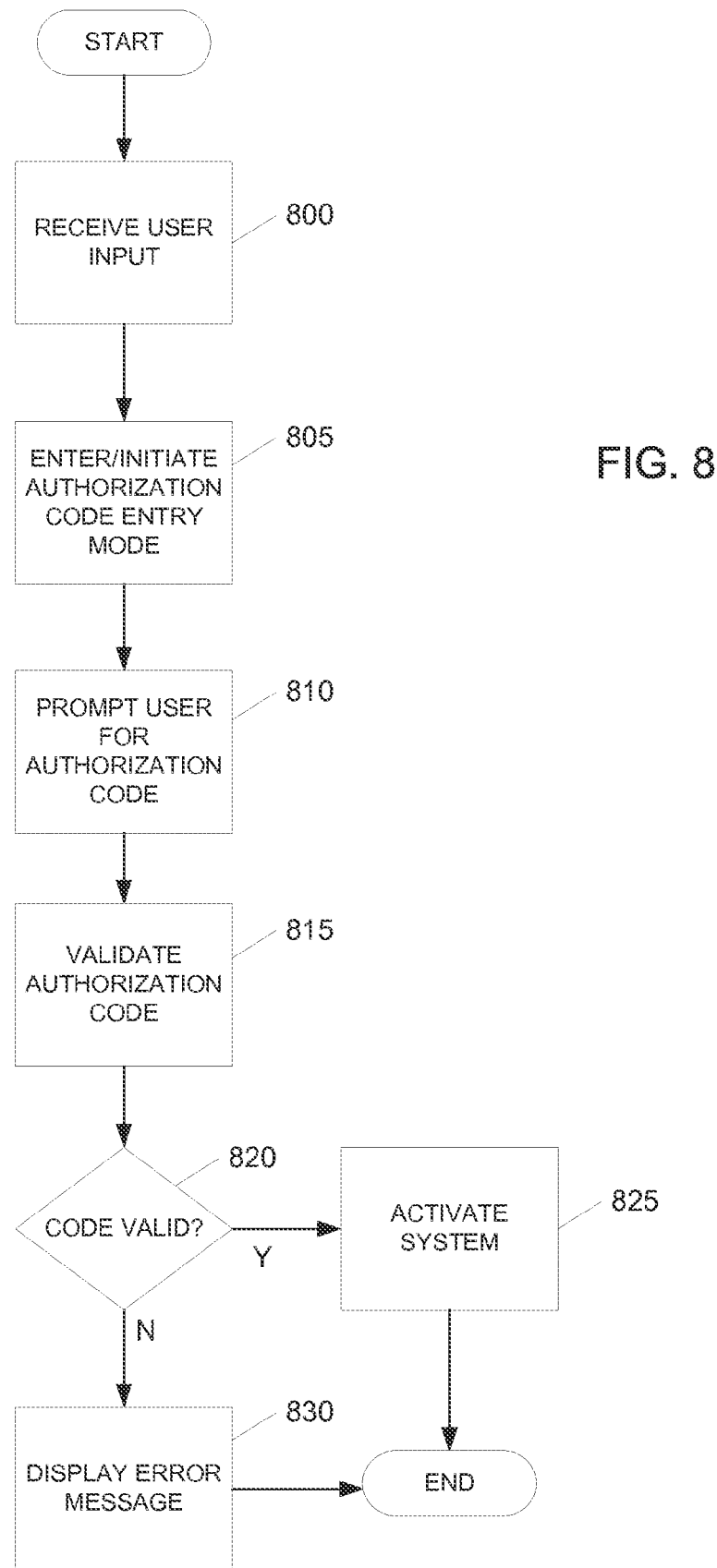
FIG. 8 is a flowchart illustrating a method for activating a service system using an authorization code according to one or more aspects described herein.

FIG. 8 is a flowchart illustrating a method for activating a service system at a point of sale, such as a fuel pump, using an authorization code. In step 800, the point of sale may receive user input from a user (e.g., a truck driver) corresponding to an authorization code entry mode. The input may include an alphanumeric code, a numeric code, a series of symbols and the like. For example, a driver may initiate an authorization code entry mode by inputting "*123." In response to the user input, in steps 805 and 810, the point of sale system may enter the authorization code entry mode and prompt the user for an authorization code, respectively. As previously discussed, the authorization code may be issued by a back office system associated with the point of sale at the time a transaction is pre-authorized. In steps 815 and 820, the point of sale system may then determine whether the authorization code is valid. For example, the point of sale system may transmit the authorization code to a back office system or point of sale for verification. Alternatively or additionally, the point of sale system may independently determine if the code is valid. If the authorization code is determined to be valid, the point of sale system may then be activated in step 825. If, on the other hand, the authorization code is invalid, the system may display an error or invalid authorization code message in step 830. According to one or more configurations, an authorization code may be entered and validated directly at the pump. That is, a driver may enter the authorization code into the fuel pump or service system.

Figure 9:
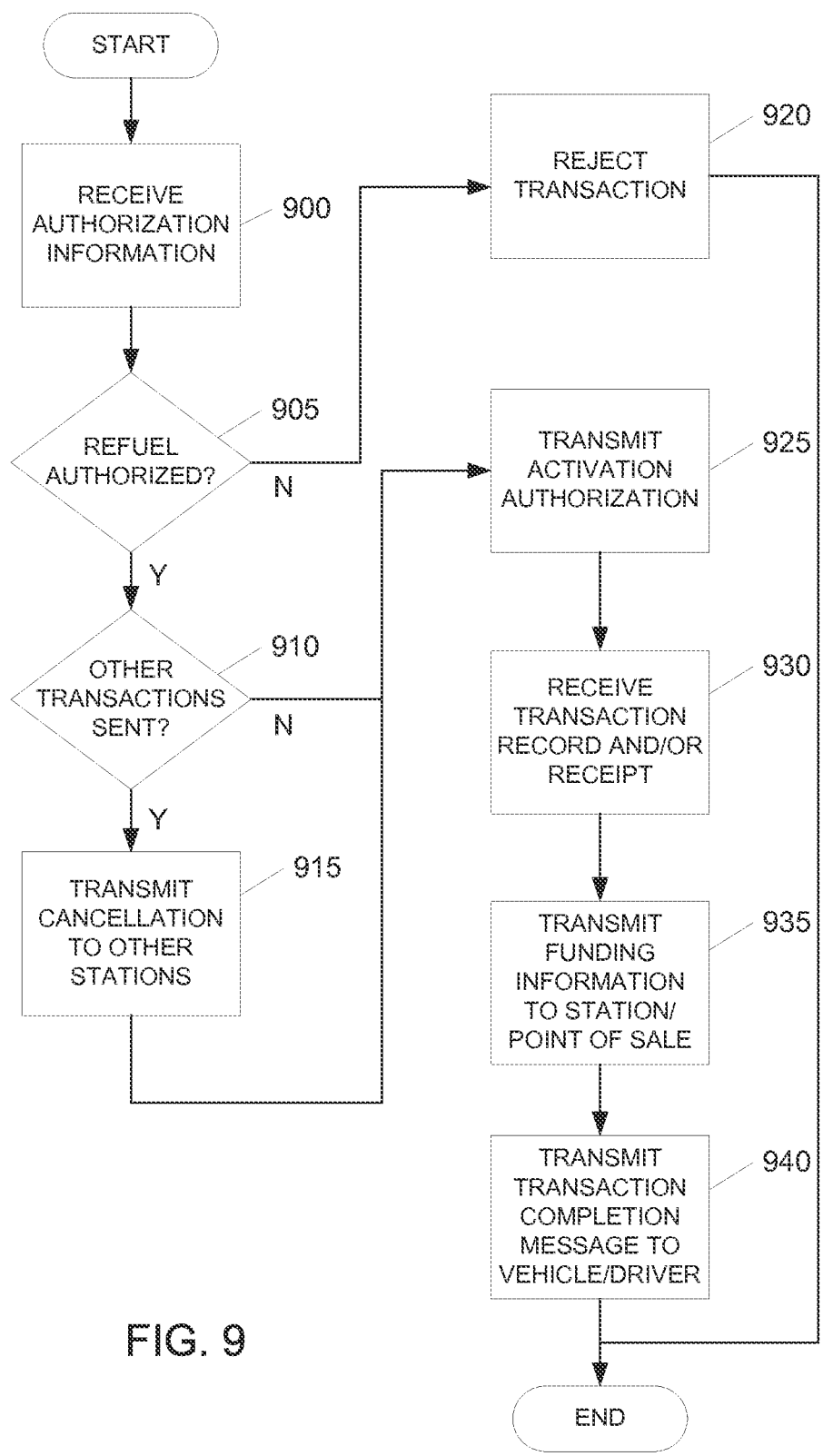
FIG. 9 is a flowchart illustrating a method for activating a fuel dispenser according to one or more aspects described herein.

FIG. 9 is a flowchart illustrating a method for activating a pump upon a vehicle's arrival at a fuel station and completing a transaction. In step 900, a back office system may receive identification and/or other authorization information associated with the vehicle and the fuel pump. For example, a driver may enter an authorization code into the pump, which may then transmit the code to the back office system for verification. In another example, a driver's communication device may scan a pump's RFID and transmit the pump's identification information along with truck information to the back office system. Once the information is received, the back office system may determine whether the truck and/or driver are authorized to refuel at the station and/or pump in step 905. One method of making such a determination is by searching a database of pre-authorized transaction requests. In the scenario where the driver and/or truck are issued a pre-authorization code, the back office system may determine whether the pre-authorization code is valid (e.g., whether it is stored in a database of valid codes). If the truck and/or driver are authorized to refuel at the station, the back office system may further determine whether multiple transaction requests were sent to multiple stations by the truck and/or driver in step 910. If so, in step 915, the back office system may send a cancellation message to all other fuel stations and/or points of sale to which a transaction request was sent. If the transaction is not authorized, then a denial message may be sent to the truck, driver and/or pump in step 920.

In step 925, after the transaction, truck and/or driver have been validated, the back office system may issue a message to the fuel station and/or point of sale requesting activation of the identified pump. With the pump activated, the driver is free to refuel his or her vehicle and complete the transaction. Once refueling is complete, back office system may receive a transaction record and receipt from the point of sale in step 930. The receipt may include an image of the receipt as well as associated data such as fuel cost, tax and the like. In response, the back office system may provide funding or payment information to the fuel station in step 935. For example, the back office system may provide the fuel station with an authorization code and account information for deducting the transaction cost. Further, the back office system may also send a completion message to the truck/driver or the carrier or both in step 940 signaling that the transaction has been concluded.

According to one or more configurations, the pump or point of sale may determine whether a transaction has been pre-authorized without having to consult the back office system. Such a method may include the back office system transmitting authorization and transaction information to the point of sale prior to arrival and activation by the requesting driver. As such, when the driver arrives at the fuel station or other service system, the pump or point of sale may independently determine whether activation is authorized without having to request verification from the back office system.

Figure 10:
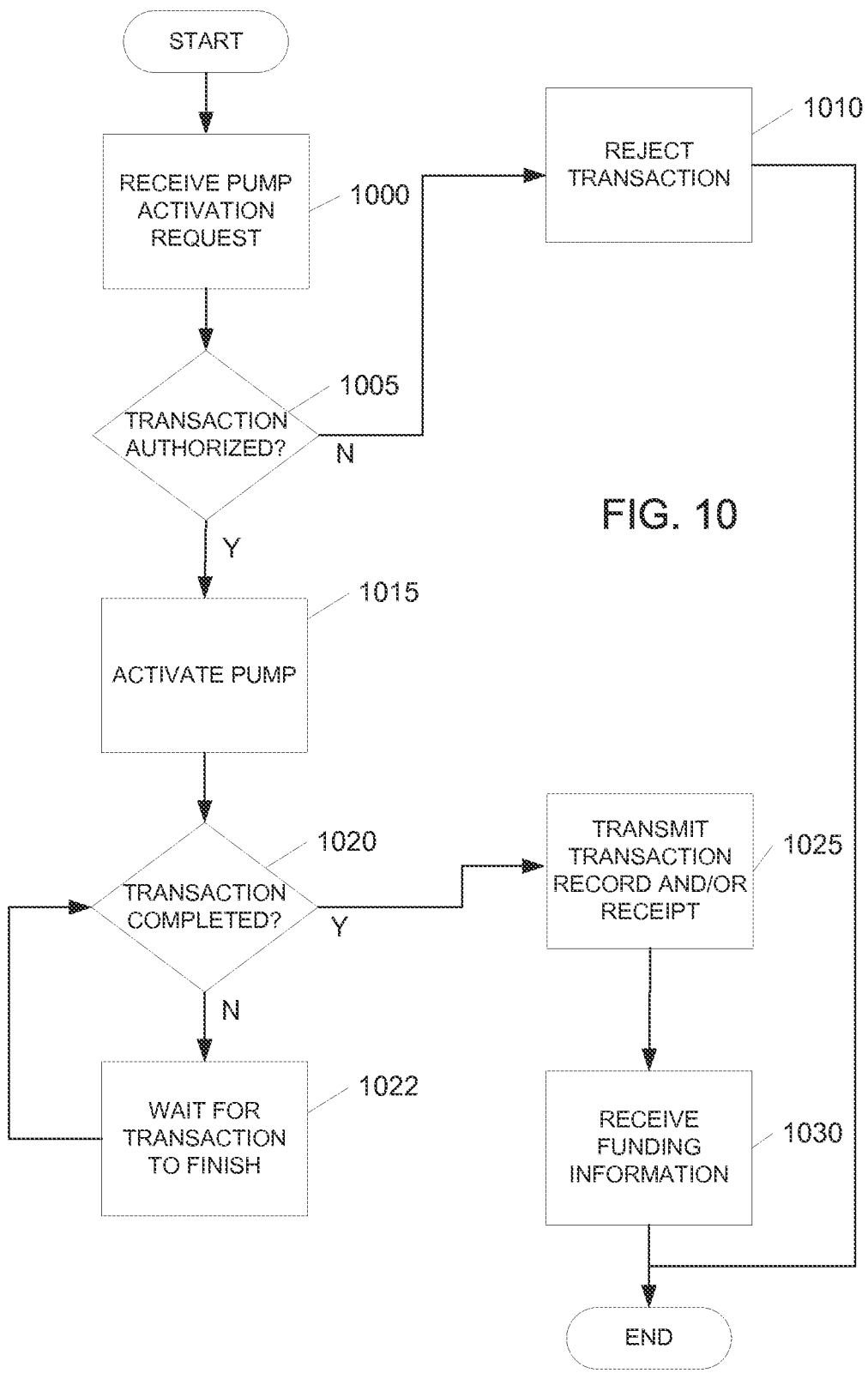
FIG. 10 is a flowchart illustrating another method for activating a fuel dispenser according to one or more aspects described herein.

FIG. 10 is a flowchart illustrating another method for activating a pump at a fuel and/or services station upon the arrival of a vehicle. In step 1000, a point of sale at a service station may receive a pump activation request from a pump. The pump activation request may include a variety of information including a transaction ID, a truck and/or driver ID and a pump ID. The information may be obtained by using a scanner and/or communication device of the pump to read an RFID chip of the truck. Alternatively or additionally, the information may be obtained by user entry through the pump. Other truck related information may be obtained by communicating with an ECM of the truck and/or a communication device of the driver. In step 1005, the fuel station office may then determine whether the transaction was previously authorized based on one or more authorization messages received from a back office system (e.g., step 255 in FIG. 2). In one example, a fuel station may store transaction authorizations in a database and determine whether transaction information received in an activation request corresponds to any of the stored transaction authorizations. If the transaction was not previously authorized by the back office system, the fuel station may send a rejection or denial message to the pump in step 1010.

If, on the other hand, the transaction was previously authorized, the fuel station office may activate the pump from which the activation message originated or which was identified in the message in step 1015. The point of sale may further detect when the fueling transaction has completed in steps 1020 and 1022. For example, the fuel station may detect that fuel has stopped flowing from the pump. Once the transaction is complete, the fuel station may then transmit a transaction log, receipt and/or other transaction related data to the back office system in step 1025. The fuel station may provide such information for the purposes of transaction authentication and payment request. Accordingly, in response to the transaction log, receipt and/or other data, the fuel station or the point of sale may receive payment information in step 1030.

Figure 11:
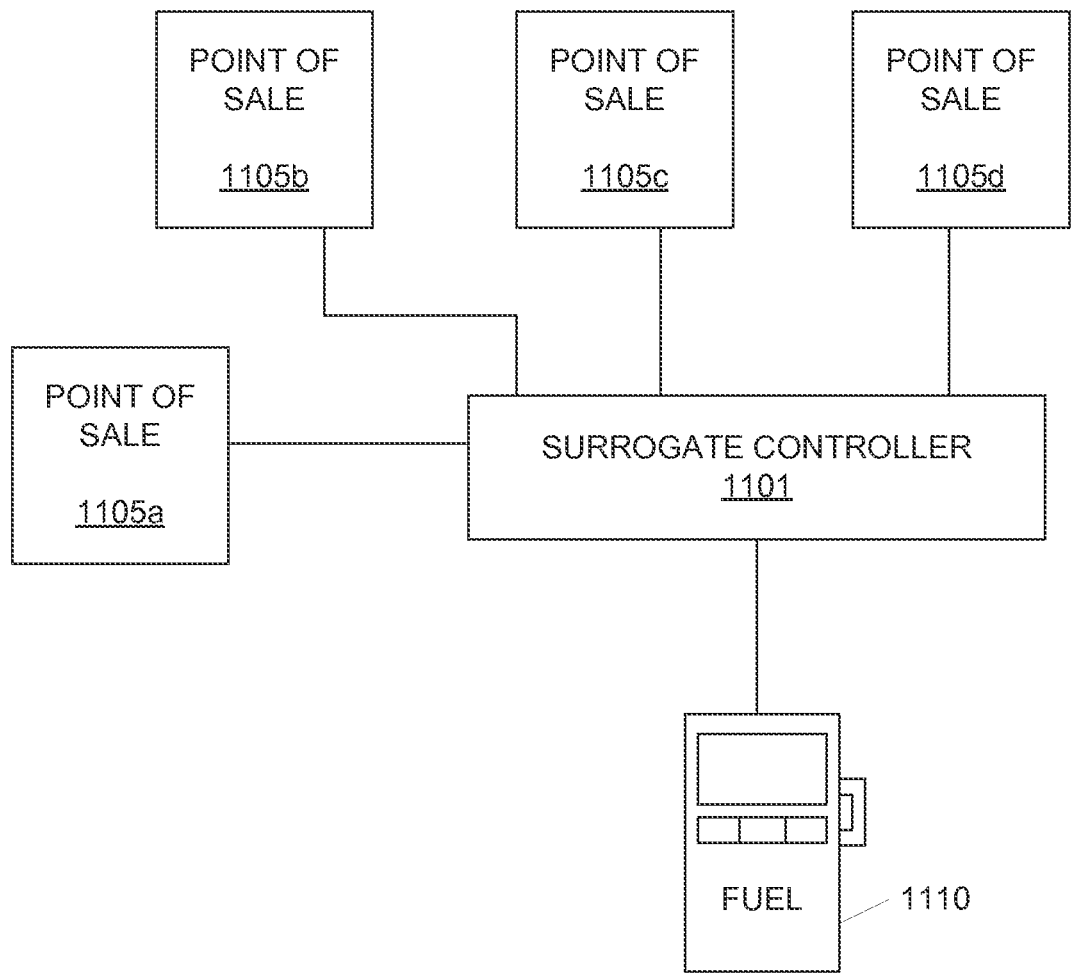
FIG. 11 illustrates a system for controlling and managing a service system for multiple point of sale systems according to one or more aspects described herein.

FIG. 11 is a diagram illustrating another system configured to activate pumps or other service systems in response to commands from multiple point of sale systems. In conventional pump activation systems, a point of sale system controls one or more dispensers (i.e., pumps) using one or more dispenser controllers. However, dispenser controllers are only controllable by a single point of sale system. That is, no management system is provided to allow multiple point of sale systems to control a single dispenser. In the system of FIG. 11, however, surrogate pump controller 1101 is implemented to manage control of dispenser 1110 by one or more of point of sale systems 1105*a*, 1105*b*, 1105*c* and 1105*d*. For example, different types of transactions at the same fuel station may be processed and managed by different point of sale systems 1105*a*, 1105*b*, 1105*c* and/or 1105*d*. As such, each of point of sale systems 1105*a*, 1105*b*, 1105*c* and 1105*d* may require access to all of the fuel station's pumps, including dispenser 1110. Thus, surrogate controller 1101 may log information and direct transmission based on which transaction is currently being performed at dispenser 1110. As an example, point of sale system 1105*b* may request activation of dispenser 1110 for transaction ID #5928. In response, surrogate controller 1101 may verify that the activation request is authorized and subsequently activate dispenser 1110. Upon completing of a transaction, dispenser 1110 may return data such as transaction cost and an amount of fuel dispensed to surrogate controller 1101 which may then transfer the data to point of sale system 1105*b*. Accordingly, each point of sale system 1105*a*, 1105*b*, 1105*c* and 1105*d* might only be provided with information corresponding to the transactions which they manage. In one or more configurations, surrogate controller 1101 may further include inventory accounting systems for tracking fuel dispensation statistics of dispenser 1110 and one or more corresponding transactions.

FIG. 12 is a flowchart illustrating a method for managing a service system such as fuel dispenser 1110 (FIG. 11) for multiple point of sale systems. Multiple point of sale systems may be used at a service station to handle multiple types of transactions. In step 1200, a first activation request associated with a particular transaction ID may be received, at a surrogate controller, from a first point of sale system. In step 1205, a second activation request may be received from a second point of sale system. In one example, the first point of sale system might only be used for pre-authorized transactions while the second point of sale system may handle all other types of transactions. In step 1207, the surrogate controller may verify that the transactions corresponding to the first and second activation requests are authorized. For example, the controller may look for an authorization flag in the activation request. In steps 1210 and 1215, once the controller verifies that the activation requests are authorized, the controller may identify a first service system and a second service system corresponding to each of the activation requests, respectively. The identification process may be facilitated by a driver identifying a particular service system as part of an activation request. This identification may, in one or more instances, be in the form of a numeric or alphanumeric ID number. Once identified, the first service system and second service system may be activated in step 1220. For example, the surrogate controller may transmit a signal to the service systems directly or through an intermediary such as one or more dispenser controllers.

Upon completion of the transaction, transaction log information may be received from the service system in step 1225. For example, a cost associated with the transaction as well as an amount of fuel dispensed may be reported. In step 1230, the first point of sale system may be identified from multiple point of sale systems as the appropriate recipient of the transaction log information. The identification and determination may be made, in one example, by comparing a transaction ID transmitted along with the transaction log information with a transaction ID which may have been stored when the service system was activated. Once the corresponding point of sale system is determined, the transaction log information is transmitted thereto in step 1235. In one or more arrangements, a copy of the transaction log information may be stored locally in the surrogate control system, for various purposes including auditing and record keeping.

FIG. 13 is a flowchart illustrating a method for activating a pump at a fuel and/or services station upon the arrival of a vehicle, in accordance with at least one aspect of the disclosure. In step 1300, a point of sale system at a service station may receive transaction information that includes a pump activation request. The pump activation request and/or transaction information may include, for instance, a pre-authorization code as described herein. In addition to the pump activation request, the transaction information may include a variety of other information including a transaction ID, a truck and/or driver ID, a pump ID, and location information about the vehicle. The information may be obtained by using a scanner and/or communication device of the pump to read an RFID chip of the truck. If the pump activation request did not include vehicle location information then, in optional step 1305, the point of sale system may transmit a message to the vehicle to determine the vehicle's location with respect to the fuel station or pump. In step 1310 information regarding the proximity of the vehicle to the pump is obtained or otherwise determined by the point of sale system. Communication between the point of sale system and the vehicle may be performed using, for example, any of the approaches outlined in FIG. 5, including, for example, an RFID chip, NFC chip, and the like. Alternatively, or additionally, vehicle location information may be provided along with the pump activation request.

According to one or more aspects, location information may be required to validated or signed by one or more entities or devices. For example, a point of sale system or service station system may require that location information be digitally signed by a carrier information system or service. In another example, location information may be required from a third party source. Accordingly, in a particular example, if the service station/point of sale system cannot directly determine a location of the vehicle (e.g., by short-range detection via a detector of the service station/point of sale system), the service station/point of sale system may request the location information be provided through a third party (e.g., a GPS location information provider different from the vehicle, driver and/or carrier).

In step 1315, the fuel station office may then determine whether the fuel dispensing is authorized. For example, the fuel station may determine whether the proximity of the vehicle to the dispensing pump is sufficiently close, or within a predetermined proximity, to establish that the fuel will be dispensed into the carrier's vehicle and not a third party's vehicle. The proximity of the vehicle to the dispensing pump may be determined through GPS, RFID or NFC. The fuel station system may recognize the vehicle based on a vehicle identifier provided during a pre-authorization request or other communications. The vehicle identifier may correspond to a transponder identification, a receiver identifier, a transmitter identifier, a license plate number, a VIN number and the like and/or combinations thereof. Accordingly, when verifying the proximity of the vehicle, the fuel station system may verify that the proximity determination is being performed for the correct vehicle. In a particular example, the fuel station system may compare an identifier provided in the location information to an identifier provided in the pre-authorization request. If the transaction is denied because the vehicle is too far from the pump, the fuel station may send a rejection or denial message to the dispensing pump in step 1340. In addition, the attempt of an unauthorized transaction may be reported (step 1345) to the carrier by transmitting a record (step 1350) to indicate that an unauthorized transaction was attempted. Such records may be used to discipline a driver or bring criminal actions.

If, on the other hand, the transaction is authorized, the fuel station office may activate the dispensing pump from which the activation message originated or which was identified in the message in step 1300. The point of sale system may further detect when the fueling transaction has completed in step 1325. For example, the point of sale system may detect that fuel has stopped flowing from the dispensing pump. Alternatively, as illustrated in step 1330, the point of sale system may wait until the transaction has completed. Once the transaction is complete, the fuel station may then transmit a transaction log, receipt and/or other transaction related data to the back office system in step 1335. The fuel station may provide such information for the purposes of transaction authentication and payment request.

In some arrangements, the point of sale system or service station may periodically, aperiodically or continually monitor the location/proximity of the vehicle to be fueled. Such monitoring allows the point of sale system or service station to automatically end a transaction (e.g., shut off a pump) once the vehicle has moved outside of the required proximity of the fuel pump.

While the methods and systems described herein have related, in greater part, to fueling transactions and fuel dispensation systems, one of skill in the art will appreciate that the methods and system may be applied to any of a number of transaction types and service systems. For example, a transaction request for tire air may be processed and authorized in much the same way as fuel. Specifically, the transaction request may be pre-authorized and an air dispenser may be activated upon arrival of the requesting vehicle and driver. Other transaction types that may similarly implement the aforementioned methods and systems include maintenance service requests (e.g., oil change, changing tires, vehicle washing, etc.), parking reservation requests and/or cargo pick-up/drop-off requests. Further, other shipping and transportation industries may also implement the systems and methods described herein. For example, mail and other cargo are commonly transported by airplane and/or boat. As such, pre-authorization and processing may also be used to streamline airplane and boat operations such as refueling and maintenance services.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method for activating a fuel pump system, the method comprising the steps of:
receiving, by a computing device of a vehicle service station, transaction information for a pre-authorized fueling transaction at the vehicle service station;
wherein the transaction information includes an activation request for a fuel pump system from a vehicle and a confirmation of funding by a carrier organization employing at least one of the vehicle and a driver of the vehicle, wherein the confirmation is specific to the pre-authorized fueling transaction;

receiving, by the computing device of the vehicle service station, a first vehicle identifier issued by a back office system associated with the vehicle service station, prior to an arrival of the vehicle at the vehicle service station;

upon the arrival of the vehicle at the vehicle service station, determining, by the computing device of the vehicle service station, a location of the vehicle using location information determined from at least one of a GPS system, an NFC chip, and an RFID chip of the vehicle and received by a scanner associated with the fuel pump system from a communication device of the vehicle, wherein the location information is electronically signed by the communication device of the vehicle and further includes a second vehicle identifier;

determining, by the computing device of the vehicle service station, whether the vehicle is within a predetermined proximity of the fuel pump system based on the location information of the vehicle and based on a location of the fuel pump system;

determining, by the computing device of the vehicle service station, whether the first vehicle identifier matches the second vehicle identifier; and upon determining that the vehicle is within the predetermined proximity of the fuel pump system and determining that the first and second vehicle identifiers match, activating, by the computing device of the vehicle service station, the fuel pump system to dispense fuel into the vehicle.

2. The method of claim 1, wherein the transaction information includes location information corresponding to the location of the vehicle.

3. The method of claim 1, further comprising:
receiving and logging, by the computing device of the vehicle service station, transaction data from the fuel pump system upon completion of fuel dispensing, wherein the transaction data includes a cost associated with the fuel dispensing.

4. The method of claim 3, further comprising the step of transmitting a record of the transaction data to the carrier organization.

5. The method of claim 1, wherein the confirmation of funding includes a confirmation of vehicle credentials and a confirmation of sufficient funds from the carrier organization for the fueling transaction.

6. The method of claim 1, further comprising:
determining, by the computing device of the vehicle service station, that the vehicle is not within the predetermined proximity of the fuel pump system; and
denying, by the computing device of the vehicle service station, the activation request for the fuel pump system.

7. The method of claim 6, further comprising:
reporting, by the computing device of the vehicle service station, that an unauthorized transaction was attempted to the carrier organization.

8. A non-transitory computer readable storage medium storing computer readable instructions that, when executed, cause a processor to:
receive transaction information for a pre-authorized fueling transaction at a vehicle service station;
wherein the transaction information includes an activation request for a fuel pump system from a vehicle and a confirmation of funding by a carrier organization employing at least one of the vehicle and a driver of the vehicle, wherein the confirmation is specific to the pre-authorized fueling transaction;
receive a first vehicle identifier issued by a back office system associated with the vehicle service station, prior to an arrival of the vehicle at the vehicle service station;
upon the arrival of the vehicle at the vehicle service station, determine a location of the vehicle using location information determined from at least one of a GPS system, an NFC chip, and an RFID chip of the vehicle and received by a scanner associated with the fuel pump system from a communication device of the vehicle, wherein the location information is electronically signed by the communication device of the vehicle and further includes a second vehicle identifier;
determine whether the vehicle is within a predetermined proximity of the fuel pump system based on the location information of the vehicle and based on a location of the fuel pump system;
determine whether the first vehicle identifier matches the second vehicle identifier; and
upon determining that the vehicle is within the predetermined proximity of the fuel pump system and determining that the first and second vehicle identifiers match, activate the fuel pump system to dispense fuel into the vehicle.

9. The non-transitory computer readable storage medium of claim 8, wherein the transaction information includes location information corresponding to the location of the vehicle.

10. The non-transitory computer readable storage medium of claim 8, further comprising computer readable instructions that, when executed, cause a processor to:
receive and log transaction data from the fuel pump system upon completion of fuel dispensing, wherein the transaction data includes a cost associated with the fuel dispensing.

11. The non-transitory computer readable storage medium of claim 10, further comprising computer readable instructions that, when executed, cause a processor to:
transmit a record of the transaction data to a carrier organization.

12. The non-transitory computer readable storage medium of claim 8, wherein the transaction information further includes a confirmation of funding by a carrier organization employing a driver of the vehicle, wherein the confirmation of funding is specific to the pre-authorized fueling transaction.

13. A system comprising:
a processor; and
a memory storing computer readable instructions configured to execute, cause the system to:
receive transaction information for a pre-authorized fueling transaction at a vehicle service station;
wherein the transaction information includes an activation request for a fuel pump system from a vehicle and a confirmation of funding by a carrier organization employing at least one of the vehicle and a driver of the vehicle, wherein the confirmation is specific to the pre-authorized fueling transaction;
receive a first vehicle identifier issued by a back office system associated with the vehicle service station, prior to an arrival of the vehicle at the vehicle service station;
upon the arrival of the vehicle at the vehicle service station, determine a location of the vehicle using location information determined from at least one of a GPS system, an NFC chip, and an RFID chip of the vehicle and received by a scanner associated with the fuel pump system from a communication device of the vehicle, wherein the location information is electronically signed by the communication device of the vehicle and further includes a second vehicle identifier, determine whether the first vehicle identifier matches the second vehicle identifier;

determine whether the vehicle is within a predetermined proximity of the fuel pump system based on the location information of the vehicle and based on a location of the fuel pump system; and upon determining that the vehicle is within the predetermined proximity of the fuel pump system and that the fueling transaction was pre-authorized by a carrier organization, activate the fuel pump system to dispense fuel into the vehicle.

14. The system of claim 13, wherein the transaction information includes location information corresponding to the location of the vehicle.

15. The system of claim 13, comprising additional memory storing computer readable instructions that, when executed, cause the system to:

receive and log transaction data from the fuel pump system upon completion of fuel dispensing, wherein the transaction data includes a cost associated with the fuel dispensing.

16. The system of claim 15, comprising additional memory storing computer readable instructions that, when executed, cause the system to:

transmit a record of the transaction data to the carrier organization.

17. The system of claim 13, wherein the transaction information further includes a confirmation of funding by a carrier organization employing the vehicle, wherein the confirmation of funding is specific to the pre-authorized fueling transaction.

* * * * *